A. de FIGANIERE.
Making Phosphate of Lime.
No. 59,978.  Patented Nov. 27, 1866.
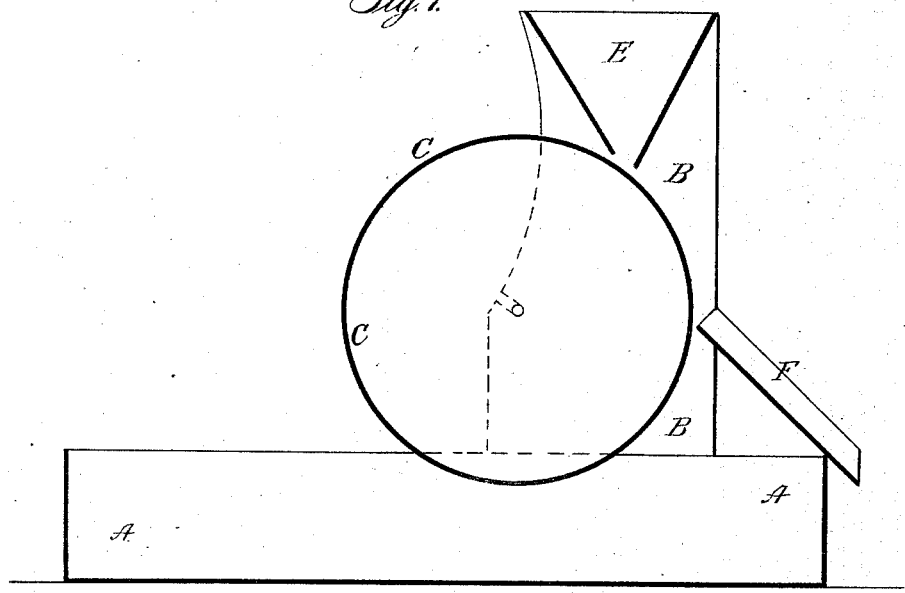
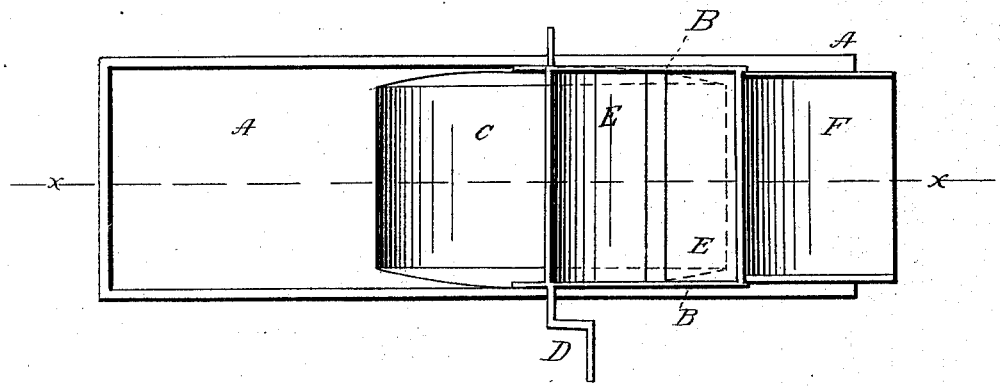
Witnesses:  Inventor:

United States Patent Office.

IMPROVEMENT IN THE MANUFACTURE OF SUPER-PHOSPHATE OF LIME.

A. DE FIGANIÉRE, OF PHILADELPHIA, PENNSYLVANIA.

Letters Patent No. 59,978, dated November 27, 1866.

SPECIFICATION.

TO ALL WHOM IT MAY CONCERN:

Be it known that I, A. DE FIGANIERE, of Philadelphia, in the county of Philadelphia, and State of Pennsylvania, have invented a new and useful Improvement in the Manufacture of Super-Phosphate of Lime; and I do hereby declare that the following is a full, clear, and exact description thereof, which will enable others skilled in the art to make and use the same, reference being had to the accompanying drawings, forming part of this specification, in which—

Figure 1 is a vertical section of my improved apparatus for moistening the guano or other fertilizer with sulphuric acid, taken through the line $x, x$, fig. 2.

Figure 2 is a top view of the same.

Similar letters of reference indicate like parts.

My invention has for its object to improve the manufacture of super-phosphate of lime, by the more thorough incorporation of the acid with the guano or other fertilizer, than can be done when the operation is performed by hand labor in the manner heretofore practised. And it consists, first, in making the super-phosphate of lime by bringing powdered guano or any other suitable fertilizing material into contact with a surface covered or dampened with sulphuric acid. And second, in the apparatus by means of which this is accomplished; said apparatus being formed by the combination of an acid tank, revolving cylinder, hopper and scraper, with each other, as hereinafter more fully described.

In the manufacture of super-phosphate of lime, as heretofore practised, the sulphuric acid has been incorporated with the guano or other fertilizer by hand labor, and consequently they have not been thoroughly and uniformly mixed. In preparing the super-phosphate according to my improved method, the acid and fertilizer are uniformly mixed. To accomplish this, I use the apparatus hereinafter described; but the same result may be obtained by the use of various other apparatus, and consequently I do not limit myself exclusively to the use of this.

A is the tank in which the sulphuric acid is placed, the size of which must depend upon the amount of work to be done. To the sides of the tank, A, are secured the supports, B, in which are formed the bearings for the journals of the cylinder, C. One of the journals of the cylinder C extends outward, and upon it is formed or to it is attached a crank, D, or a pulley, by means of which motion is given to the said cylinder. To the upper ends of the supports B, is attached a hopper, E, the discharging orifice of which is directly over the face of the cylinder C, and a little to that side of the vertical central line of said cylinder towards which it revolves. The powdered guano or other fertilizer is placed in the hopper E, and flows through the opening at its bottom upon the surface of the cylinder C, which is kept constantly wet with sulphuric acid by revolving through the acid in the tank A. The moistened fertilizer is removed from the surface of the cylinder C, by the scraper F, which also acts as a spout to conduct it to the receptacle prepared for its reception. The flow of the powdered material from the hopper E, may be regulated by a damper placed in the said hopper in the ordinary manner, and the amount of acid supplied by the cylinder C, may be regulated at pleasure by regulating the velocity of its revolution. By this process I am able to furnish a superior super-phosphate and at the same time to economize labor and time in its preparation.

What I claim as new, and desire to secure by Letters Patent, is—

1. Making super-phosphate of lime, by bringing the powdered guano, or other suitable fertilizing material, into contact with a surface covered or dampened with sulphuric acid, substantially as herein described.

2. An apparatus for incorporating sulphuric acid with powdered guano, or other suitable fertilizer, formed by the combination of the acid tank A, the cylinder C, the hopper E, and the scraper F, with each other, substantially as herein shown and described.

A. DE FIGANIÉRE.

Witnesses:
W. W. DOUGHERTY,
JOHN WELSH.